Nov. 28, 1950      P. H. THOMPSON      2,531,655
GAS DISSOLVING APPARATUS
Filed March 2, 1946

Parke H. Thompson,
Inventor.
Haynes and Koenig
Attorneys.

Patented Nov. 28, 1950

2,531,655

UNITED STATES PATENT OFFICE 2,531,655

GAS DISSOLVING APPARATUS

Parke H. Thompson, Kirkwood, Mo., assignor, by mesne assignments, to Marion L. J. Lambert, doing business as Crystal-Flo Products Company, St. Louis, Mo.

Application March 2, 1946, Serial No. 651,647

4 Claims. (Cl. 261—82)

This invention relates to gas-dissolving apparatus and, more particularly, to water carbonators.

Among the several objects of the invention may be noted the provision of a water carbonator wherein tap water received at tap water temperature may be efficiently carbonated; the provision, in such a carbonator including a pressure tank having a tap water supply inlet and an inlet for gas under pressure, of means for automatically maintaining tank pressure less than the tap water pressure; the provision in such a carbonator of improved means for agitating and spraying the water requiring no rotary shaft packing; and, the provision of apparatus of the class described which requires relatively few and simple parts. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
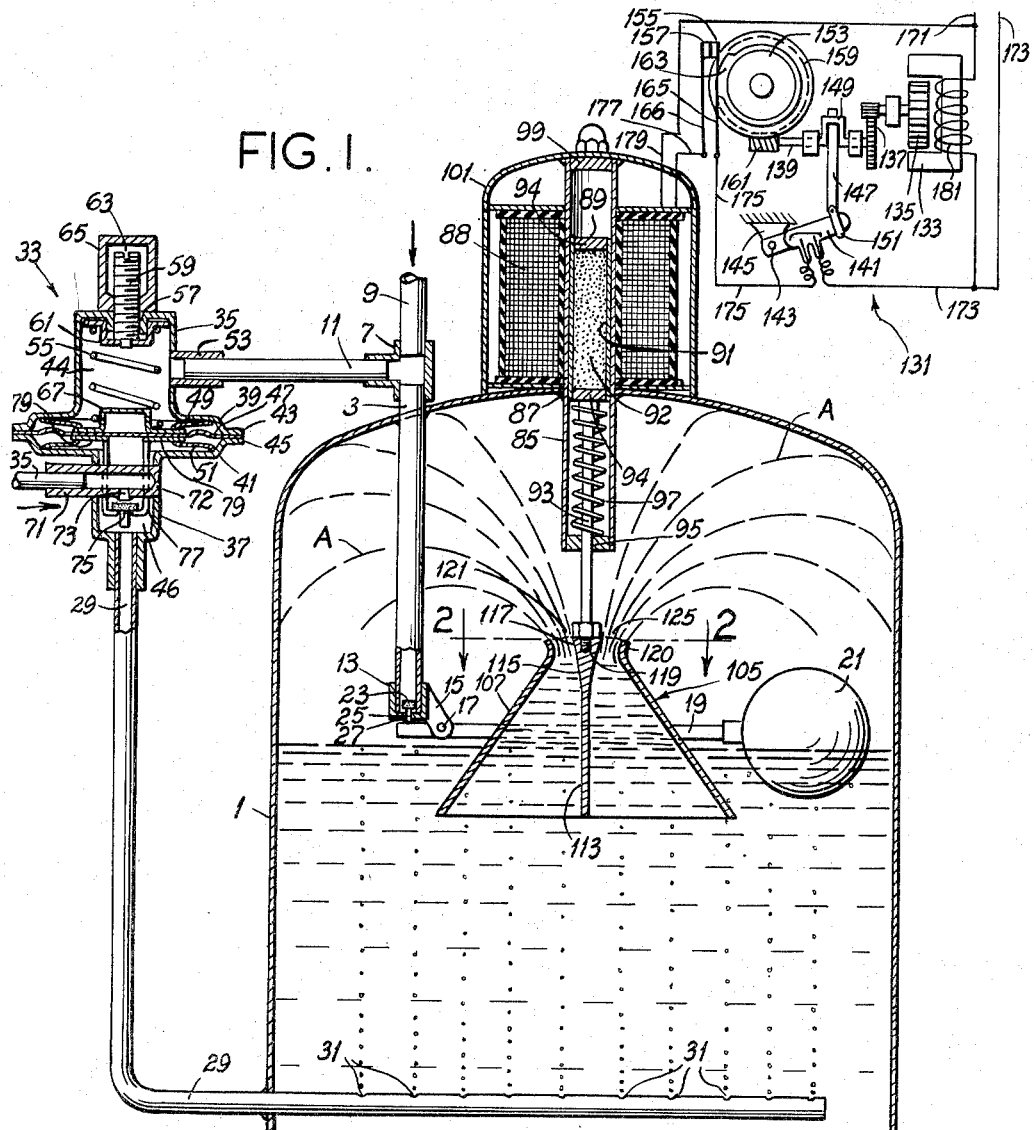
Figure 2:
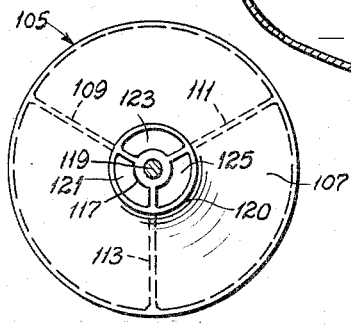

In the accompanying drawings, in which one of various possible embodiments of the invention is illustrated, Fig. 1 is a vertical section through carbonating apparatus exemplifying the invention, and illustrating in a diagrammatic elevation a control associated therewith; and Fig. 2 is a section on line 2—2 of Fig. 1.

Similar reference characters indicate corresponding parts throughout the several views of the drawings.

Referring now to the drawings, a pressure tank 1, containing tap water which is to be carbonated, has a tap water inlet pipe 3 and a carbonated water outlet pipe 5. The top of the tank 1 is dome-shaped. Pipe 3 is connected into one arm of a T 7, a tap water supply pipe 9 being connected into the other arm of the T. Pipe 9 is connected to a suitable source of water under pressure, such as a city water main. A conduit 11, to be referred to hereinafter, is connected into the stem of the T.

The normal water level in tank 1 is as shown in Fig. 1. The water level is controlled by a float-operated valve in the lower end of water inlet pipe 3, the lower end of pipe 3 being closed by a cap 13, having a bracket 15 depending therefrom. Pivotally mounted at 17 in the bracket 15 is a float arm 19 having a float 21 at one end and a valve 23 on valve stem 25 at its other end. Valve 23 is adapted to close an aperture 27 in the end of said cap 13 when float 21 rises. This occurs upon a rise of the water level in said tank above normal, said aperture 27 being opened when the water level falls below normal, due to withdrawal of carbonated water from the tank. Aperture 27 is sufficiently large so that water may flow around valve stem 25.

A carbon dioxide ($CO_2$) gas inlet pipe 29 extends into tank 1 and has apertures 31 within the tank from which gas bubbles into the water. Pipe 29 is connected, outside the tank, to the outlet of a gas supply regulator and control valve generally designated 33. This valve controls flow of gas from a $CO_2$ gas supply pipe 35 to said tank. Pipe 35 is connected to a source of $CO_2$ under pressure. Control valve 33 is provided to maintain the pressure in tank 1 less than the pressure of water in inlet 3, since, if the tank pressure were permitted to become higher than the pressure of the water supply, water could not flow into the tank.

Control valve 33 comprises a casing formed by upper and lower generally cup-shaped valve casing members 35 and 37, respectively, having recessed flanges 39 and 41 thereon. Between their rims 43 and 45 is clamped a flexible diaphragm 47, in sealed relation thereto, dividing said casing into upper and lower chambers 44 and 46. Diaphragm 47 is centered by a pair of annular spring rings 49 and 51 disposed in the recesses of the flanges 39 and 41, respectively. Conduit 11 is connected to an inlet 53 in the wall of the upper valve casing member 35 so that said upper chamber 44 is filled with tap water and the diaphragm 47 is pressed from above by the pressure of said tap water. Diaphragm 47 is also adjustably biased downward by a compression spring 55 in the upper chamber 44. The top wall of the upper member 35 is formed with a threaded bore 57 in which is threaded an adjusting stud 59 having a spring centering seat 61 on its end within the casing, its other end being slotted, as indicated at 63, to receive an adjusting tool. Adjustment of stud 59 is maintained by a lock nut 65. The lower end of spring 55 is centered by a seat 67 on diaphragm 47.

The lower valve casing member 37 has an inlet conduit 71 seated in apertures in opposite sides of the walls of said member 37. One end of said inlet conduit is closed, as indicated at 72, and the gas supply pipe 35 is connected into the other end of said inlet conduit. An aperture 73 is formed in the lower wall of said inlet conduit 71 within chamber 46. A valve element 75 is adapted to close off said aperture 73 when raised from the position thereof shown in Fig. 1 into seating engagement with that portion of the wall of inlet conduit 71 surrounding said aperture. The valve element 75 is mounted in a U-shaped stirrup 77 having lateral arms 79 retained against the under side of diaphragm 47 by the lower annular spring ring 51.

It will be observed that flexible diaphragm 47 is pressed upward by pressure of gas in lower valve chamber 46. The lower spring ring 51 exerts upward force on the diaphragm 47. The pressure of water in upper chamber 44, the compression spring 55, and the upper spring ring 49 exert downward pressure on the diaphragm 47. The lower spring ring 51 is formed to exert substantially more force on diaphragm 47 than the combined forces of spring 55 and upper spring ring 49. The differential between the upward and the downward spring forces may be varied by adjusting spring 55. This differential is such that the diaphragm 47 is moved upward to move valve element 75 to close off aperture 73 when the gas pressure in lower chamber 46 (which is the same as the pressure in the tank) is a predetermined amount less than the water pressure in the upper chamber 44. For example, spring 55 may be adjusted to provide a five-pound operating pressure differential between the line 9 and the interior of the tank 1. If the tap water pressure is, for example, thirty pounds, the valve element will close when the gas pressure is twenty-five pounds, and will open when the gas pressure is less than twenty-five pounds. If the tap water pressure varies, the same operating pressure differential is maintained automatically. If the tap water pressure should fall to twenty pounds, the valve will close when the gas pressure is fifteen pounds. Screw 59 controls only the amount of the pressure differential.

A tube 85, preferably of stainless steel is secured (as by welding), in an aperture 87 in the top of pressure tank 1. This tube projects upward from the tank through a solenoid 88, the latter being mounted on the tank. Slidably mounted in said tube 85 is a solenoid plunger or armature 89, preferably comprising a completely closed cylindrical stainless steel or similar non-corrosive cylindric container 91, hermetically sealed at both ends by caps 94 and filled with tightly packed magnetic particles 92, such as iron filings, or particles of precipitated pure iron. A plunger rod 93, secured to the lower end of said plunger 89, extends downward into the tank, sliding in a bearing 95 in the lower end of tube 85. A compression spring 97 is interposed between the lower end of the plunger 89 and the bearing 95, biasing plunger 89 upward. The upper end of tube 85 is hermetically sealed by a welded plug 99, so as to prevent leakage of gas from the tank 1, and the solenoid 88 and the projecting end of tube 85 are enclosed within a dome-shaped casing 101.

A plunger bell or cup, generally designated by reference character 105, is secured to the lower end of plunger rod 93. The plunger cup, as illustrated in Fig. 1, is substantially in the form of a hollow truncated cone, the conical wall 107 thereof being internally braced by three radial ribs 109, 111 and 113. The ribs merge at the center line of the cone and are thickened at their upper central portions, as indicated at 115, forming a hub 117. Hub 117 is formed with a threaded bore therein receiving threaded lower end 119 of plunger rod 93. Said thickened portions 115 also cooperate with an outwardly curved lip 120 on the upper end of conical wall 107 to form, in effect, a nozzle for directing water forced through the upper end of said cup 105 outwardly, as indicated by dash lines A in Fig. 1.

Upon energization of solenoid 88, plunger cup 105 is rapidly forced down into the water in tank 1, thereby forcing water upward through the three nozzle apertures 121, 123 and 125 between the ribs in the upper end of said plunger cup 105. The apertures cause the water to spray upward and outward. Fig. 1 shows the plunger and plunger cup approaching the lower end of the stroke. When plunger 89 moves downward, spring 97 is compressed and, upon deenergization of the solenoid 88, the spring forces the plunger to the upper limit of its stroke. The specific construction of the plunger cup 105 described herein is merely exemplary of the principles involved and any other form of plunger cup adapted to spray water upward and outward, as illustrated by the dashed lines A in Fig. 1, may be used. The chief criterion is that it shall be hollow and flared downward as a bell with a relatively small outlet, or outlets, at the top. This accelerates the water to form a spray.

The plunger assembly (comprising plunger 89, plunger rod 93 and plunger cup 105) is adapted periodically to be reciprocated rapidly for a short time interval. This is accomplished by a solenoid control, generally designated 131. This control is so constructed as, for example, to deenergize solenoid 88 completely for fourteen minutes, then rapidly and intermittently energize and deenergize solenoid 88 for one minute, then completely deenergize solenoid 88 for fourteen minutes, and so on. It will be understood that these time intervals are merely illustrative.

Solenoid control 131, as shown in Fig. 1, comprises a constant-speed timing motor 133, such as a synchronous motor, whose rotor 135 is geared, as indicated at 137, to a crankshaft 139. A mercury switch 141 is pivotally mounted at one end 143 to a stationary bracket 145. A connecting rod 147 is connected between crankpin 149 of crankshaft 139 and a collar 151 on the other end of said mercury switch 141, so that rotation of crankshaft 139 oscillates switch 141 at a rate desired for reciprocation of the plunger 105. Such oscillation of switch 141 rapidly makes and breaks the circuit in which said switch is connected. A cam 153 is arranged to close a pair of switch contacts 155 and 157 periodically. This cam is driven by a worm gear 159 meshing with a worm 161 fixed on the end of crankshaft 139. This worm and worm gear drive functions as a speed reducing mechanism so that cam 153 is driven at a speed lower than that of crankshaft 139. The lobe 163 of cam 153 is of such form as to maintain contacts 155 and 157 closed for a predetermined period, such as the one minute period referred to previously, and the remainder of the periphery of the cam 153 is of such form as to permit contacts 155 and 157 to remain open for a longer predetermined period, such as the fourteen minute period referred to previously. Contact 155 is fixed on the free end of a spring switch arm 165 biased against cam 153. Contact 157 is disposed at the end of a fixed switch arm 166. The electrical circuit comprises solenoid 88, contacts 155 and 157 and switch 141, and a parallel circuit including the field of motor 133, both circuits being energized by power supply lines 171 and 173. Specifically, the power supply line 173 is connected to one terminal of mercury switch 141. Conductor 175 connects the other terminal of said mercury switch to arm 165 of the cam-controlled switch. Conductor 177 connects one terminal of solenoid 88 to fixed switch arm 166 and conductor 179 connects the other terminal of solenoid 88 to power supply line 171. Field 181 of motor 133 is connected across power lines 171 and 173, so that it is not affected by opening and closing of switch 141 and contacts 155 and 157.

The operation of the apparatus is as follows:

Pipes 3 and 11 and upper valve casing member 35 are filled with tap water from tap water supply pipe 9. If the water level in tank 1 is normal, valve 23 is closed. No water flows into the tank. If the water level is too low, due to carbonated water having been drawn off through outlet 5, valve 23 opens and admits water to make up the deficiency.

It may be assumed that, at the start of the operation, tank 1 has been filled to normal level with tap water, but that there is no gas therein. Since, in such event, there is less pressure on the underside of diaphragm 47 than on its upper side, the diaphragm is biased downward by the pressure of tap water in upper valve chamber 44, and valve element 75 opens. Gas then flows from the source through pipe 35 and through aperture 73 into the lower chamber 46 and through gas inlet pipe 29 into the tank. Pressure builds up in the tank and lower chamber 46 until it is sufficiently high to overcome the downward bias on diaphragm 47. Valve element 75 then closes to cut off flow of gas into the lower chamber 46 and the tank. As has been previously pointed out, said valve element closes when the pressure in the tank and lower chamber 46 builds up to a predetermined value somewhat less than the pressure of the tap water. How much less is determined by the setting of compression spring 55. Control valve 33 thus functions to maintain the pressure of gas in the tank always less than the pressure of the tap water supply, so that tap water may always flow into the tank when called for by opening of the float valve 23. This eliminates any necessity for a tap water pump to force water into the tank against the pressure therein. The relationship between the pressure of gas in the tank and the pressure of the tap water supply is maintained even though the pressure of the tap water supply should vary, as it often does, since the valve closes whenever the tank pressure becomes a predetermined number of pounds less than the tap water pressure, despite the actual values of these pressures. If the pressure of the tank should fall, due, for example, to drawing off of carbonated water therefrom, the gas pressure in lower chamber 46 falls and valve element 75 opens to admit gas to the tank and build up the pressure therein to said value a predetermined number of pounds less than tap water pressure. This provides a desirable constant degree of carbonation.

When contacts 155 and 157 are closed by the lobe 163 of cam 153, and when the terminals of mercury switch 141 are bridged by the mercury therein, the circuit of solenoid 88 is completed and the solenoid is energized to drive its plunger 88, plunger rod 93 and cup 105 downward, forcing said cup down into the water and spraying water upward and outward through the nozzle apertures 121, 123 and 125 in the upper end of said cup. Since mercury switch 141 is being rapidly oscillated, however, it functions rapidly to make and break said circuit, thereby rapidly intermittently energizing and deenergizing the solenoid 88. Such action causes rapid reciprocation of plunger cup 105 to agitate and spray the water upward and outward as previously described. Such action continues as long as the lobe 163 on cam 153 maintains contacts 155 and 157 closed. When lobe 163 rides off the spring arm 165, contacts 155 and 157 are opened, and even though mercury switch 141 continues to oscillate, the solenoid circuit is broken until lobe 163 again engages arm 165. Thus, cam 153 functions to condition the solenoid circuit for operation of the solenoid for a short time interval and switch 141 functions to energize and deenergize the solenoid rapidly during that short interval.

Carbonation is effected both in the water and in the space above. Gas flowing into the tank through inlet pipe 29 bubbles out into the water through apertures 31. Some of the gas is dissolved as it bubbles upward through the water. The remainder bubbles to the surface and out into the space thereabove. Some of the latter is dissolved in the spray above the water surface, gas in the space thereabove coming into intimate surface contact with the broken-up water particles in said spray and with the large surface area of water cascading over the interior of the walls of the tank. The water in the tank is agitated and sprayed upward and outward against the dome-shaped top and side walls of the tank during spaced short intervals. The water cascading over the dome-shaped top and side walls of the tank also presents large surface areas thereof not only for gas absorption but also for heat transfer. For example, the tank 1 may be surrounded by a cooling medium such as ice.

The length of the period of operation of the plunger and the length of the interval therebetween are determined by the speed and development of cam 153, and may be varied by substituting different worms and worm gears and/or different cams to provide for different conditions of use. If the demand for carbonated water is great in a particular instance, such a worm 161, worm gear 159 and cam 153 may be used as will effect relatively longer periods of operation of the plunger with relatively shorter intervals between such periods.

The construction herein disclosed may be made very small and this is an important advantage. Structurally it is very simple. Another advantage is that no shaft seals or packings are required. The tube 85 is merely welded shut at its upper end by plug 99, and to the tank at 87, and leakage of gas from the tank is thereby effectively prevented. The solenoid control 131 may be of a suitable construction other than that disclosed and may be enclosed within the dome-shaped casing 101.

An important point of the invention is that although the armature 89 is operating in an atmosphere of moisture and $CO_2$, it will not, like ordinary laminated iron armatures, tend to disintegrate. This is because of the use of the enclosing stainless steel tube 91 surrounding the magnetic iron 92. Such a tube is non-corrosive in the presence of the contents of the tank and protects the comminuted magnetic iron, which would otherwise be corroded. This form of iron also has low hysteresis losses and is easier to organize in its protective compartment than would be laminated iron sheets.

It is to be understood that all parts within the tank, and even the tank itself, are to be made of non-corrosive materials, such as stainless steel.

Although the particular disclosure of the invention is in reference to a water carbonator, its principles apply to any gas dissolving apparatus of analogous requirements.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In apparatus of the character described, a tank means for maintaining liquid at a predetermined level below the top thereof and a free gas space over the liquid, a plunger slidably mounted in the top of said tank and extending downward into said tank, means for reciprocating said plunger, a hollow plunger cup mounted rigidly on the lower end of said plunger, the wall of said cup flaring outward and downward from said plunger, said cup being located at such position in reference to said predetermined level as to be partially immersed when the plunger is at the lower limit of its stroke, said cup further being constricted in its upper end in the formation of a nozzle adapted, when the cup is forced downward into liquid in the tank, to spray said liquid upward and outward into the free gas space and against the top and upper side walls of said tank in shower-like formation.

2. In apparatus of the character described, a plunger cup comprising a body in the form of a hollow truncated cone having an outturned lip at the small end thereof, internal radial ribs integral therewith merging at the center line thereof, said ribs being thickened centrally at their ends adjacent said small end to form a hub, said thickened portions of said ribs also cooperating with said lip to form outwardly directed nozzle-like apertures in the small end of said body between said ribs.

3. In apparatus of the character described, a tank means for maintaining liquid at a predetermined level below the top thereof and a free gas space over the liquid, a plunger slidably mounted in the top of said tank and extending downward into said tank, means for reciprocating said plunger, a hollow plunger cup mounted rigidly on the lower end of said plunger, the wall of said cup flaring outward and downward from said plunger, said cup being located at such position in reference to said predetermined level as to be partially immersed when the plunger is at the upper limit of its stroke, said cup further being constricted in its upper end in the formation of a nozzle adapted, when the cup is forced downward into liquid in the tank, to spray said liquid upward and outward into the free gas space and against the top and upper side walls of said tank in shower-like formation.

4. In apparatus of the character described, a tank means for maintaining liquid at a predetermined level below the top thereof and a free gas space over the liquid, a plunger slidably mounted in the top of said tank and extending downward into said tank, means for reciprocating said plunger, a hollow plunger cup mounted rigidly on the lower end of said plunger, the wall of said cup flaring outward and downward from said plunger, said cup being located at such position in reference to said predetermined level as to be partially immersed when the plunger is at either limit of its stroke, said cup further being constricted in its upper end in the formation of a nozzle adapted, when the cup is forced downward into liquid in the tank, to spray said liquid upward and outward into the free gas space and against the top and upper side walls of said tank in shower-like formation.

PARKE H. THOMPSON.

REFERENCES CITED

The following references are of record in the file of this patent:

UNITED STATES PATENTS

| Number | Name | Date |
|---|---|---|
| 47,145 | Westcott | Apr. 4, 1865 |
| 95,401 | York | Sept. 28, 1869 |
| 200,008 | Trumbull | Feb. 5, 1878 |
| 427,188 | Rebok et al. | May 6, 1890 |
| 1,207,061 | Maas | Dec. 5, 1916 |
| 1,262,148 | Wendelburg | Apr. 9, 1918 |
| 1,338,592 | Sanford | Apr. 27, 1920 |
| 1,630,575 | Maas | May 31, 1927 |
| 1,714,336 | Yaxley | May 21, 1929 |
| 1,776,405 | Wilsey | Sept. 23, 1930 |
| 1,857,349 | Buehm | May 10, 1932 |
| 2,158,010 | Marr | May 9, 1939 |
| 2,223,348 | Boekeker et al. | Dec. 3, 1940 |
| 2,306,714 | Rowell | Dec. 29, 1942 |
| 2,331,820 | Weyard | Oct. 12, 1943 |
| 2,353,835 | Lane | July 18, 1944 |

FOREIGN PATENTS

| Number | Country | Date |
|---|---|---|
| 50,210 | Germany | Dec. 28, 1889 |
| 399,770 | Germany | Aug. 9, 1924 |